US008737956B2

(12) United States Patent
Stenfelt et al.

(10) Patent No.: US 8,737,956 B2
(45) Date of Patent: May 27, 2014

(54) COMMUNICATION BETWEEN MME/S4 SGSN AND PCRF

(71) Applicant: Telefonaktiebolaget L M Ericsson (publ), Stockholm (SE)

(72) Inventors: John Stenfelt, Goteborg (SE); Lasse Olsson, Shanghai (CN); Anders Lundstrom, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/650,764

(22) Filed: Oct. 12, 2012

(65) Prior Publication Data
US 2013/0102277 A1 Apr. 25, 2013

Related U.S. Application Data

(63) Continuation of application No. PCT/EP2012/070270, filed on Oct. 12, 2012.

(60) Provisional application No. 61/547,083, filed on Oct. 14, 2011.

(51) Int. Cl.
*H04M 11/00* (2006.01)

(52) U.S. Cl.
USPC ......... 455/406; 455/410; 455/411; 455/456.1

(58) Field of Classification Search
None
See application file for complete search history.

(56) References Cited

U.S. PATENT DOCUMENTS

2010/0260141 A1* 10/2010 Chowdhury et al. ......... 370/331
2011/0007706 A1    1/2011 Shaikh
2011/0158090 A1*  6/2011 Riley et al. ................... 370/230
2011/0183667 A1*  7/2011 Tamura et al. ................ 455/433

OTHER PUBLICATIONS

Corici, M., et al., "A Network Controlled QoS Model Over the 3GPP System Architecture Evolution", Wireless Broadband and Ultra Wideband Communications, 2007, Auswireless 2007, The 2nd International Conference on IEEE, PI, Aug. 1, 2007, 6 pages, XP03112781.
Motorola, "PCRF interactions with MME/UPE and SAE anchor", 3GPP Draft, S2-064248_PCRF_Interfaces, 3rd Generation Partnership Project (3GPP), Mobile Competence Centre, 650, Route Des Lucioles, F-06921 Sophia-Antipolis Cedex, France, vol. SA WG2, No. Montreal, Nov. 9, 2006, 3 pages, XP050229737.
Ericsson, "Establishment of Bearers & MME/UPE Implications", 3GPP Draft, S2-070620_S2_070567REV1, 3rd Generation Partnership Project (3GPP), Mobile Competence Centre, 650, Tioute Des Lucioles, F-06921 Sophia-Antipolis Cedex, France, vol. SA WG2, No. Florence, Jan. 26, 2007, 5 pages XP05029331.
International Seach Repot and Written Opinion issued on Jan. 30, 2013 in PCT application No. PCT/EP2012/070270, 12 pages.

* cited by examiner

*Primary Examiner* — Suhail Khan
(74) *Attorney, Agent, or Firm* — Rothwell, Figg, Ernst & Manbeck, P.C.

(57) ABSTRACT

This disclosure is directed to a method in a MME node or a S4-SGSN node for dynamic Policy and Charging Rules Function (PCRF) assisted management of network parameters, where the method comprises sending or receiving network related parameters to or from, respectively, a PCRF node through a direct MME/S4-SGSN-PCRF interface. This disclosure is also directed to a MME node and a S4 SGSN node and a PCRF node configured to operatively perform the method.

16 Claims, 16 Drawing Sheets

Direct Interface 610 – MME/S4-SGSN to PCRF

3GPP Release-7 PCRF interfaces

3GPP Release-11 PCRF interfaces

Existing flow of information

Direct Interface 610 – MME/S4-SGSN to PCRF

Example MME/S4-SGSN or PCRF node configuration

Establishment of Interface 610 at Attach

Establishment of Interface 610 at MME/S4-SGSN relocation

MME/S4-SGSN reporting via Interface 610

PCRF provisioning via Interface 610

Use Case: Location based charging

SPID to PCRF via Interface 610 at Attach/PDP-context activation

SPID to PCRF via Interface 610 at subscription update

SPID to PCRF via Interface 610 at MME/S4-SGSN relocation

SPID to PCRF via Interface 610 at PCRF Update

// COMMUNICATION BETWEEN MME/S4 SGSN AND PCRF

CROSS REFERENCE TO RELATED APPLICATIONS

This application claims the benefit of U.S. Provisional Patent Application No. 61/547,083, filed on Oct. 14, 2011; and this application is a continuation of International Patent Application No. PCT/EP2012/070270, filed on Oct. 12, 2012, which claims priority to said above identified provisional application. The above identified applications are incorporated by reference herein in their entirety.

TECHNICAL FIELD

Exemplifying embodiments presented herein are directed towards a method and an apparatus for communicating information via a direct interface between a PCRF node and a MME node or a S4 SGSN node.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Policy and Charging Control (PCC) was originally introduced in 3GPP standards as a mean to secure resources in the access network mainly for dynamic services (such as IMS), but also to control resource consumption for regular Internet services (P2P-traffic, web-browsing, FTP etc) and to enable Flow Based Charging (FBC).

Although the original goal with PCC has since long time been completed in 3GPP, there is still a lot of activities ongoing in standards enhancing the PCC framework with add-ons. The new functions amended to the PCC architecture have shifted the role of the PCRF from something that was originally just a requirement for IMS into a more fundamental system element.

From the very beginning the reference point between the PCRF and the access network has been the Gx interface, as shown in FIG. 1. All input data from the access network had to be passed over this interface. For dynamic services, e.g. IMS, the Rx reference point was also defined for scalability purposes i.e. to be able to have stand-alone P-CSCF and PCRF functions.

From 3GPP Release-11 we now have (as illustrated in FIG. 2) a: Gx between the PCEF and the PCRF; Rx between the PCRF and the AF; Gxx between the PCRF and the BBERF (e.g. SGW); Ud between the PCRF-FE and the UDR; Sy between the PCRF and the OCS; and Sd between the PCRF and the TDF.

To summarize all of this the Release-11 PCRF in comparison to e.g. a Release-7 PCRF has significantly better capabilities to collect input information for performing policy decisions. Policy decisions can now be made based on (not a complete list): User subscription information (From Rel-7); Access Network Specific information (from Rel-7); IMS authorized services (Rel-7); Consumed volume usage (Rel-9); 3rd party sponsorship of a service (Rel-10); Actual service used (Rel-11); Subscription defined spending limits (Rel-11).

All of this input information still serves the same purpose though and that is to be able to provide differentiated treatment (i.e. personalization) for user plane packets.

SUMMARY

Example embodiments presented herein are directed towards the establishment of a new network interface, a MME/S4-SGSN-PCRF interface. Such an interface may, in general, reduce signaling in the EPC for the provisioning of parameters from the MME/S4-SGSN dedicated to the PCRF. The example embodiments also enable the control of MME/S4-SGSN/-SGSN specific parameters being personalized, i.e., set per UE by the PCRF based e.g. on services in use, dynamic user profile (based on statistics of user mobility, service usage etc.). The example embodiments also allow for the provision of additional input parameters to the PCRF from the MME/S4-SGSN, e.g., S1-connection status, RAN capabilities, etc. and to add additional parameters for personalization to be provided from the PCRF to the MME/S4-SGSN without affecting S11/S4, S5/S8 and Gx interfaces.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
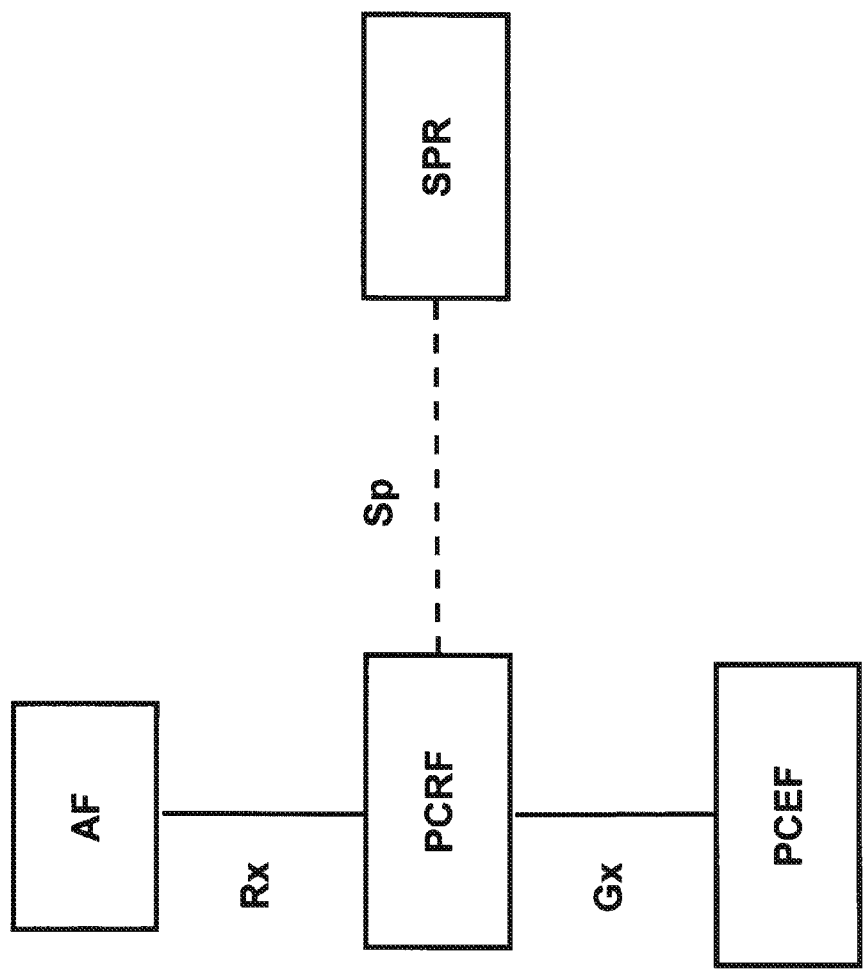
FIG. 1 is an illustrative example of PCRF interfaces.
Figure 2:
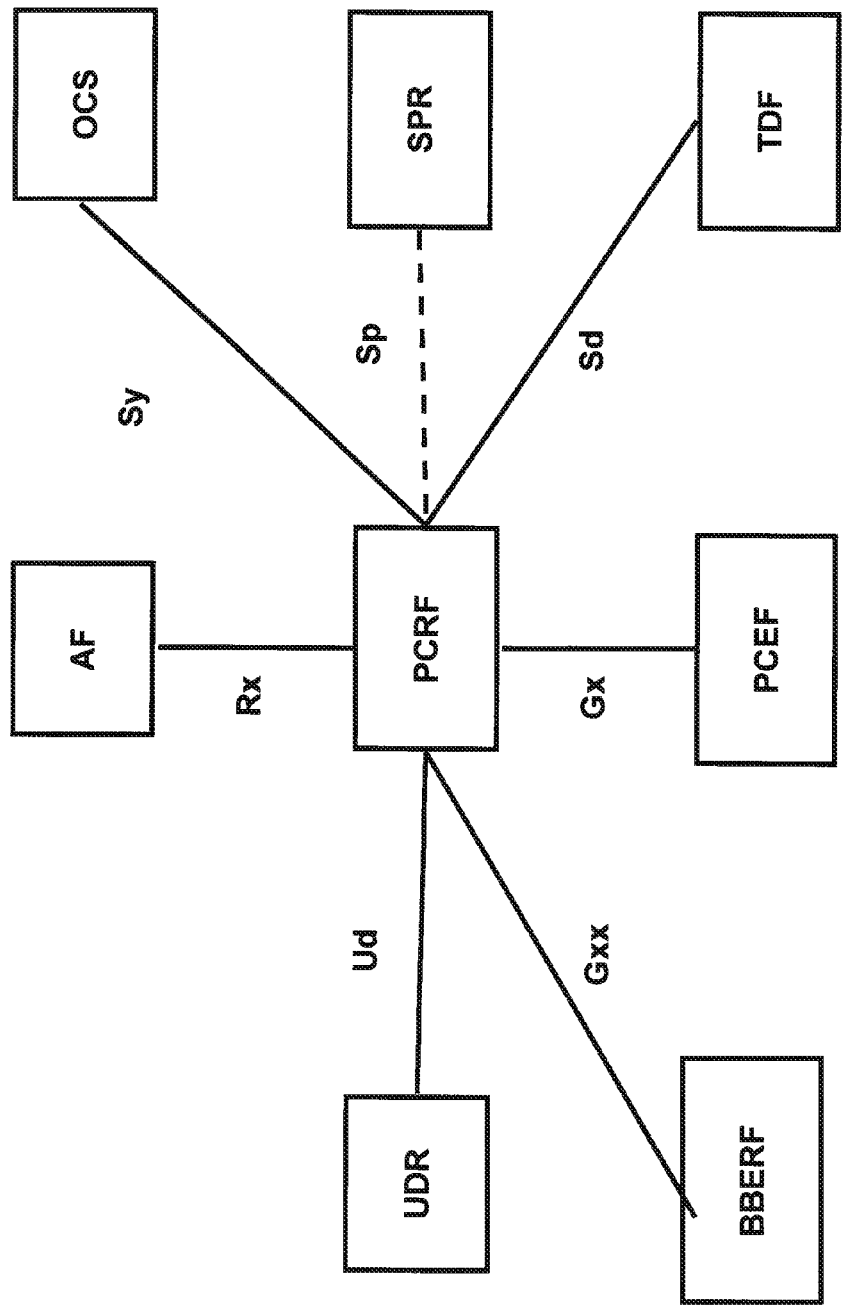
FIG. 2 is another illustrative example of PCRF interfaces.
Figure 3:
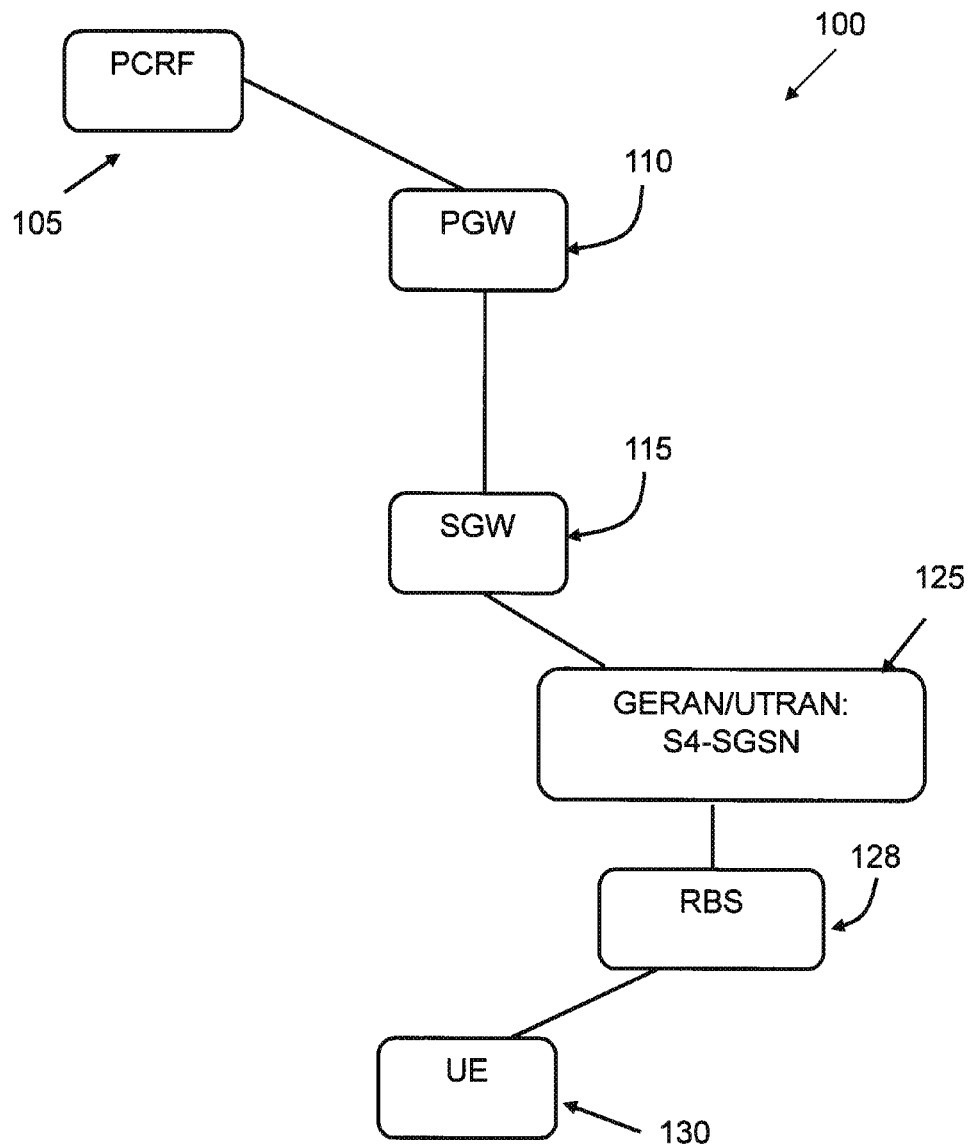
FIG. 3 is a schematic example of a wireless network.

FIG. 3 shows a schematic view of a first system 100 in which some of the example embodiments may be applied. The system 100 is a so called 2G/3G system, also sometimes referred to as a GERAN/UTRAN system. As shown, the system 100 can accommodate a number of user equipments one of which is shown as an example, with the reference number 130. Naturally, the system 100 can accommodate a large number of user equipments and is not limited to accommodating only one user equipment.

All traffic to and from the user equipment 130 is routed via a so called "base station", which, depending on the nature of the system, has different names. In the case of a GERAN/UTRAN system such as the one in FIG. 3, the base station is in this text referred to by the generic name "Radio Base Station", here and in FIG. 3 abbreviated as RBS. The RBS which the user equipment 130 is connected to is shown in FIG. 3 as RBS 128. One example of a system specific name for an RBS is NodeB, as used in 3G systems, and another example is BTS, Base Transceiver System, as used in some 2G systems.

Regardless of the kind of system, the mobility of the user equipment 130 is controlled by what will here initially be referred to generically as a "mobility management node", which, as shown in FIG. 3, in the case of GERAN/UTRAN is a so called S4-SGSN, shown as 125 in FIG. 3.

The "mobility management node" is connected to a Serving Gateway, an SGW 115, which in turn is connected to a PDN Gateway, PGW 110. The PGW 110 can be connected to a unit or a function for Policy and Charging Rules Function, a so called PCRF 105, or the PGW 110 can be arranged to take certain policy and charging actions on its own without the use of a PCRF.

Figure 4:
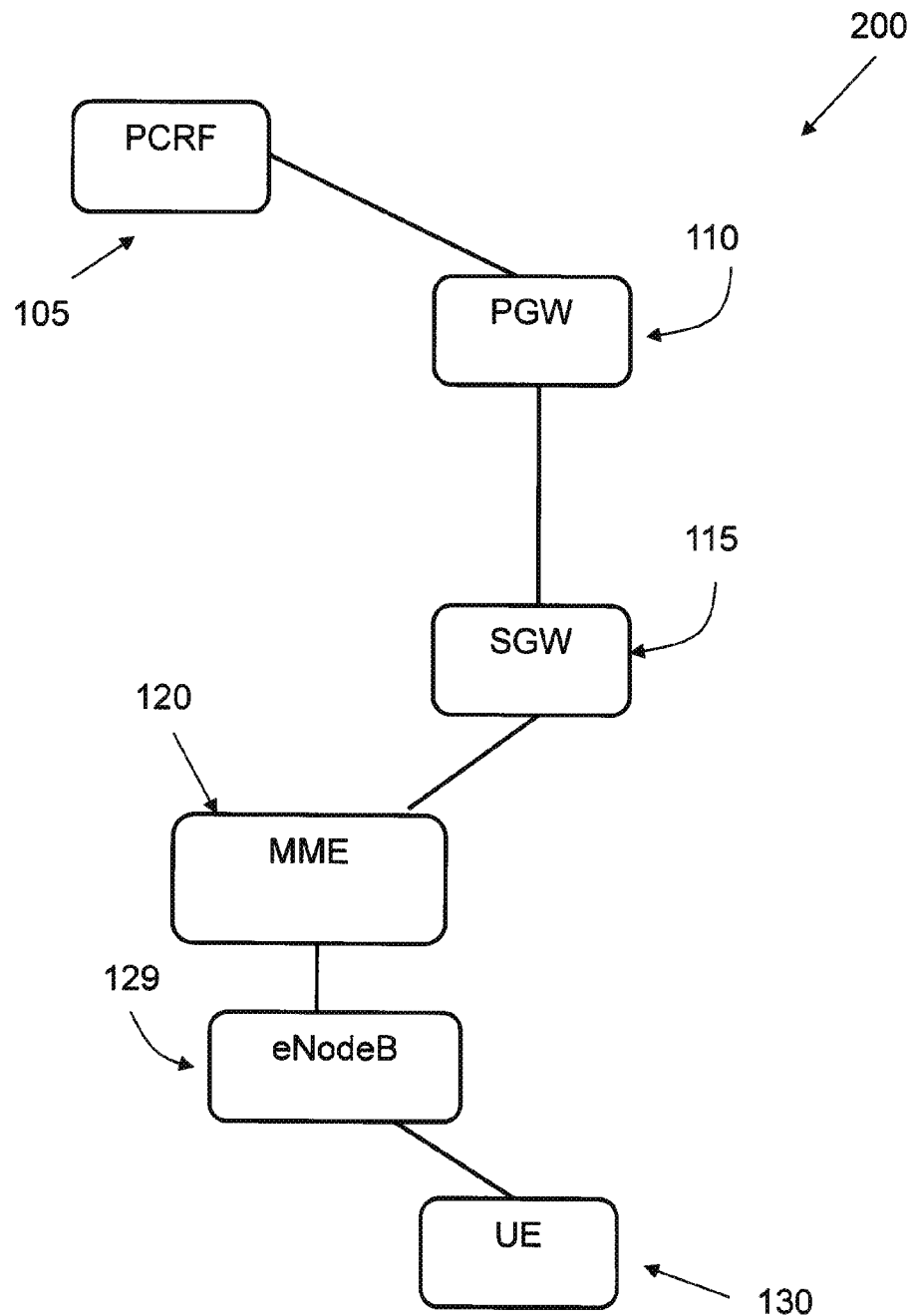
FIG. 4 is a schematic example of another wireless network.

FIG. 4 shows a schematic overview of a second system 200 in which the invention can be applied. The system 200 is a so called LTE based system, also referred to as an EUTRAN system. It should be pointed out that the terms "LTE" and "LTE based" system is here used to include both present and future LTE based systems, such as, for example, advanced LTE systems.

In a EUTRAN system such as the one 200 in FIG. 4, the "base station" is referred to as an eNodeB, shown as 129 in FIG. 4. The "mobility management node" is in a EUTRAN system referred to as a Mobility Management Entity (MME) shown as 120 on FIG. 4. The SGW and PGW of the system in FIG. 4 are the same as or similar to those in FIG. 3, and will for that reason not be described again here, which is also the case for the PCRF 105.

It should be appreciated that although FIG. 3 shows a system 100 which is a GERAN/UTRAN based system and FIG. 4 shows a system 200 which is an EUTRAN based system, the invention can also be applied in systems which combine these two technologies, i.e. combined GERAN/UTRAN and EUTRAN systems.

There are numerous problems associated with the PCRF interfaces of current systems. A few of these problems will be highlighted below as examples.

Problem Number 1

Figure 5:
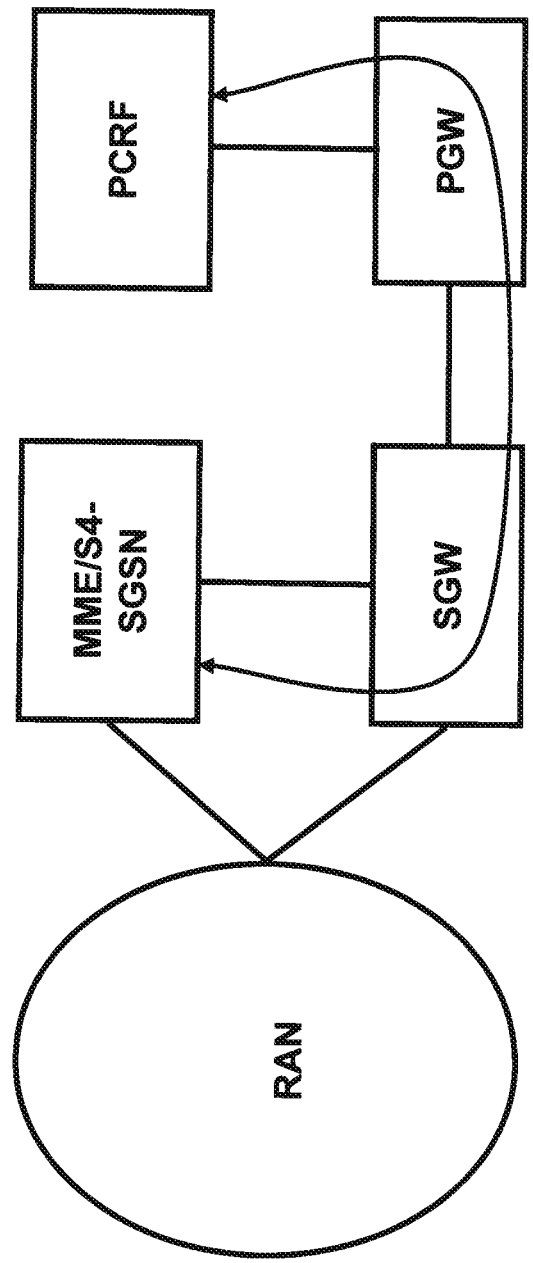
FIG. 5 is a network schematic illustrating an example flow of information.

The existing architecture for the Evolved Packet Core was designed with the "old" PCC objective in mind (when we did not have a smorgasbord of input interfaces to the PCRF). Because of this all input information such as User Location Information (ULI) from the access network still has to be provided from the MME/S4-SGSN to the SGW and PGW and then over Gx to the PCRF (as shown in FIG. 5). This information is provided on demand by the PCRF. The provisioning of this information is inefficient from a signaling point of view. For certain types of data such as Cell-Id the additional signaling load on the SGW and PGW can be significant.

Other parameters that may be of interest to the PCRF apart from ULI is RAT Type, Serving Network (Access Network capabilities), S1-connection status, Indication of bearer release, UE Timezone and also possibly CSG info. Some of those parameters can not be provided to the PCRF with existing standards, and it is unlikely that they will be in the future as this would put even higher load on the EPC.

Problem Number 2

A second problem—or lack of enabling functionality—is that currently there are no means available to dynamically set control parameters to be used in the access network. For example, user inactivity timeout that is provided by the MME to the eNodeB is set based on MME configuration. The S4-SGSN could in the same manor inform the RNC about the best suited inactivity timer based on application needs. It is imaginable that enabling the PCRF with the means to set parameters such as this could provide a mean to enable personalization also of control parameters.

A specific example may be set forth as follows: Enabling the PCRF to set user inactivity parameter per user could be based on service usage. With the Service Awareness feature of 3GPP Release-11 the PCRF could be made aware of when certain services are actually used by an end-user. The value of the user inactivity timer could be optimized for different services.

Other parameters that may be of interest to set from the PCRF are: (a) Application based paging schemes, (b) Best suited RAT per application, (c) 3GDT qualification usage controlled by application in use creating a dynamical 3GDT usage, (d) CSG, Home zone data limitations, and (e) Time based charging control schemes.

Problem Number 3

A third problem is backwards compatibility. For each new parameter that needs to be passed from/to MME/S4-SGSN/SGSN to/from PCRF support will be needed over S11/S4, S5 and over Gx (this has already been mentioned in Problem 1).

Problem Number 4

Finally, the existing 3GPP EPC architecture contains a mix of possible procedures: Procedures related to mobility, procedures related to subscription updates from the HSS, procedures related to UE resource requests, and procedures related to bearer management. With PCC-deployed at least procedures related to subscription updates and procedures related to UE resource requests are always in the interest of the PCRF and the SGW and the P-GW (i.e. the PCEF) has very little use of this information. So the procedures for EPC when PCC is deployed are (unnecessarily) complicated for the SGW and P-GW.

Figure 6:
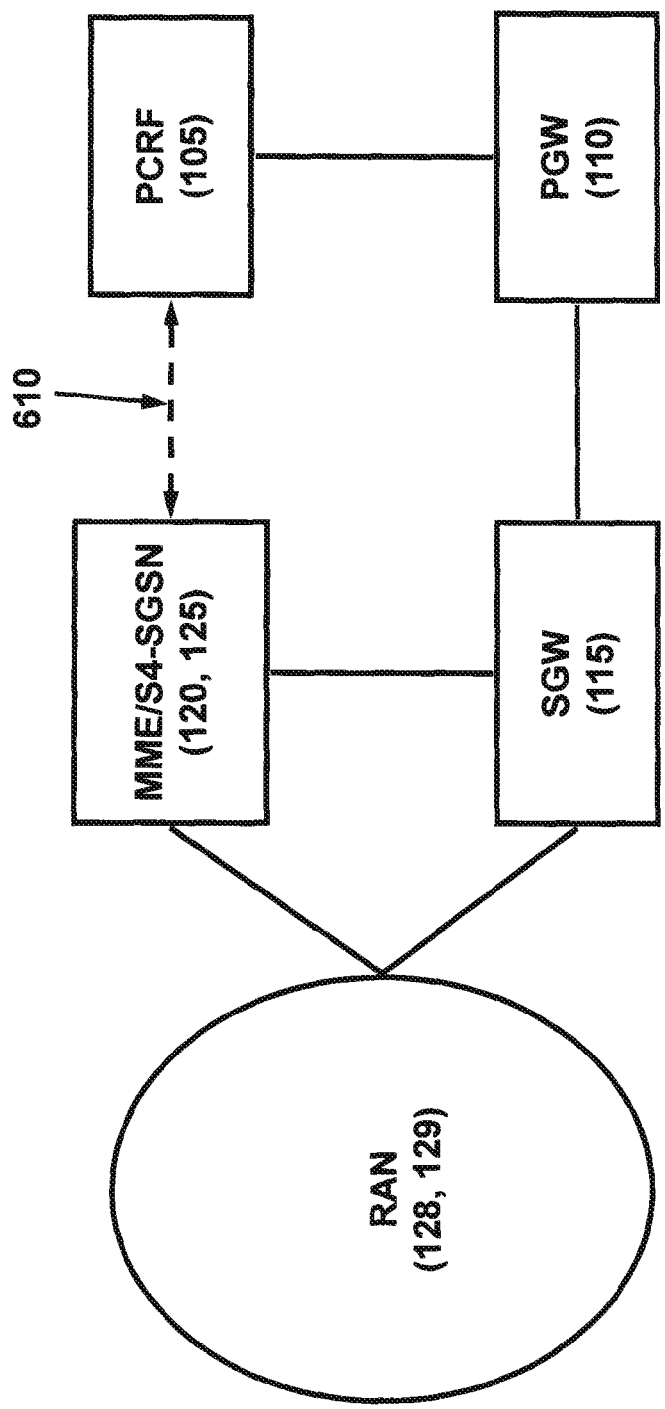
FIG. 6 is a network schematic illustrating a MME/S4-SGSN-PCRF interface 610, according to some example embodiments.

Example embodiments are presented herein which address the above mentioned problems. The basic concept of the example embodiments is to define an interface 610 directly between the MME/S4-SGSN and the PCRF, as illustrated by the dashed line in FIG. 6. This interface 610 could be similar to Gxx (but may also inherit functions from Rx, Sd or even S6a).

The interface 610 could be used to provide MME/S4-SGSN specific input directly to the PCRF, without having to relay this information via S11/S4, S5/S8 and Gx tot the PCRF (potentially V-PCRF in case of roaming with local breakout). The following existing EPC procedures (or part of procedures) are non-limiting examples of procedures which could be skipped with the use of the example embodiments: (a) HSS Initiated Subscribed QoS Modification; (b) Provisioning of i.e. ULI, Time zone information, CSG information for policy purposes during TAU/RAU.

It should be appreciated that the examples embodiments also make it possible to provide UE resource requests directly to the PCRF from the MME/S4-SGSN. In principle this would imply that UE Resource Requests would be sent directly to the PCRF (including TAD and GBR) and not to the SGW and PGW. The PCRF would then formulate PCC-rules and provide to the PGW/GGSN over Gx just as for any other service authorized over Rx. The PGW/GGSN would not see the difference between services authorized over Rx and services requested by the UE via the MME/S4-SGSN to PCRF interface 610. As a result the implementation in the PGW/GGSN would not have to support UE requested resources as all.

Basically the concept of so called "mixed mode procedures" (both UE and Network (NW) may request network resources) could be eliminated as only NW initiated procedures would remain for the SGW and PGW. The interface 610 could also be used to provide control plane policy decisions to the MME/S4-SGSN from the PCRF based on application needs such as, for example:

(a) User inactivity timeout that is provided to the eNodeB and RNC,
(b) Application based paging schemes,
(c) Best suited RAT per application,
(d) 3GDT qualification usage controlled by application in use creating a dynamical 3GDT usage.
(e) CSG, Home zone data limitations.
(f) Time based charging control schemes.

The interface 610 may be established at Initial Attach of a user between the MME/S4-SGSN and the PCRF. The interface 610 may also be established at a modification of a connection between a user and the MME/S4 SGSN and the PCRF. The interface 610 may support mobility to enable MME/S4-SGSN-change.

It should be appreciated that many of the existing procedures from the Gxx interface, that is defined between the BBERF (e.g. the SGW) and the PCRF, for so called "off-path PCC" could be re-used for this. Support for the interface 610 could be based on configuration in the MME. A new support indicator could be beneficial to provide between MME/S4-SGSN at MME/S4-SGSN change over S10 and S3.

Figure 7:
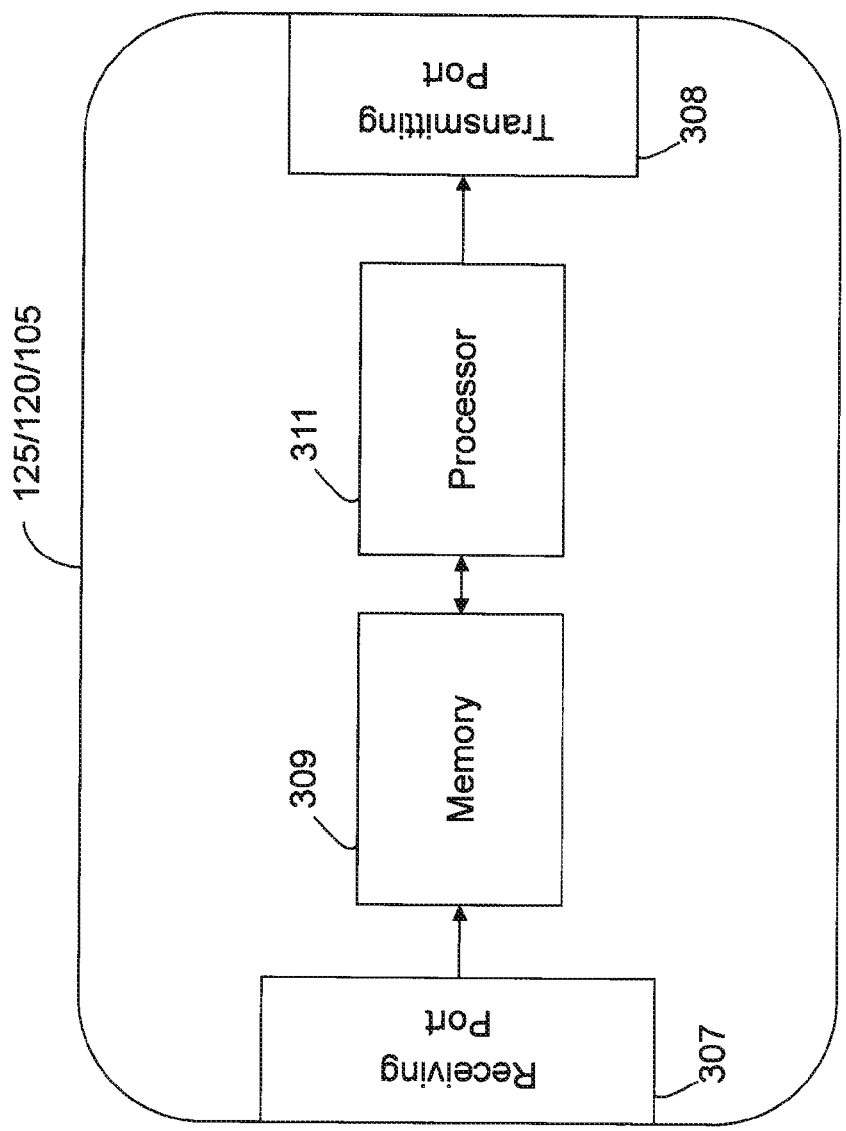
FIG. 7 is an example MME/S4-SGSN/PCRF network node configuration, according to some of the example embodiments.

FIG. 7 illustrates an example network node structure of an MME 120 node or a S4-SGSN 125 node or a PCRF 105 node, according to some of the example embodiments. The network node 120/125/105 may comprise any number of communication ports, for example a receiving port 307 and a transmitting port 308. The communication ports may be configured to receive and transmit any form of communications data. It should be appreciated that the network node 120/125/105 may alternatively comprise a single transceiver port. It should further be appreciated that the communication or transceiver port may be in the form of any input/output communications port known in the art.

The network node 120/125/105 may further comprise at least one memory unit 309. The memory unit 309 may be configured to store received, transmitted, and/or measured data of any kind and/or executable program instructions. The memory unit 309 be any suitable type of computer readable memory and may be of a volatile and/or non-volatile type.

The network node 120/125/105 may also comprise a general processing unit 311. It should be appreciated that the processing unit 311 may be any suitable type of computation unit, e.g. a microprocessor, digital signal processor (DSP), field programmable gate array (FPGA), or application specific integrated circuit (ASIC).

The attention is now directed to FIGS. 8-12, which are message sequence diagrams that illustrate different aspects of some of the example embodiments described herein.

Figure 8:
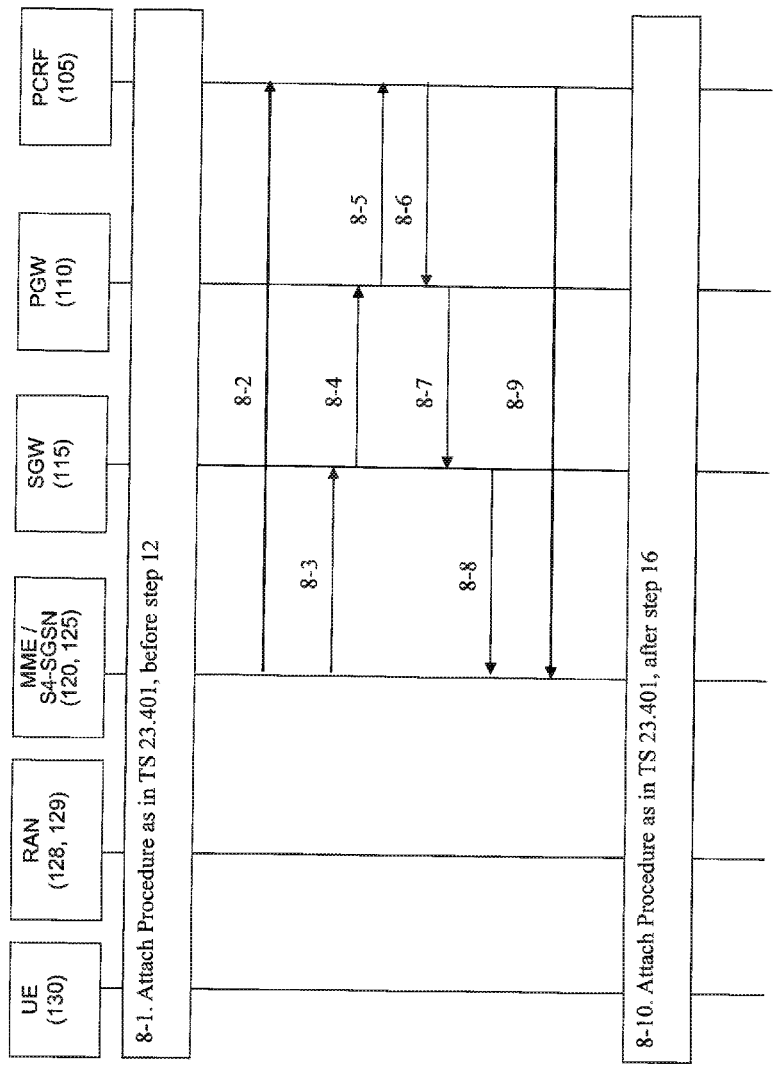
FIG. 8 is a message sequence diagram which utilizes a MME/S4-SGSN-PCRF interface 610, according to some example embodiments.

FIG. 8 illustrates an example of a MME/S4-SGSN-PCRF interface 610 establishment during an initial attach procedure, according to some of the example embodiments. The different messages of FIG. 8 will be explained below according to the corresponding heading.

Message 8-1:

An initial attach procedure may e.g. be done as described before step 12 in TS 23.401 v9.8.0 (2011-03) with reference to FIG. 5.3.2.1-1.

Message 8-2:

The MME 120 or the S4-SGSN 125 as may be the case may initiate the new interface 610 towards the PCRF 105 by sending a communication which may comprise at least the UE Identity, PDN Identifier and APN. The UE's identity and PDN Identifier requested may be used to identify the subscriber and in PCRF selection to locate the PCRF function with the corresponding IP CAN session established by the PGW 110. The MME/S4-SGSN may provide additional parameters such as MME/S4-SGSN capabilities and restriction, RAN capabilities and restriction, UE capabilities and restrictions or any other information that is available in the MME/S4-SGSN that is relevant for this user and connection.

Message 8-3:

The MME/S4-SGSN may send Create Session Request as per normal procedures.

Message 8-4:

The SGW 115 may send Create Session Request as per normal procedures.

Message 8-5:

The PGW 110 may initiate a new Gx session as per normal procedures. The PCRF 105 may correlate the Gx session with the Session Request from the MME/S4-SGSN.

Message 8-6:

The PCRF 105 may respond to the Gx session request as per normal procedures.

Message 8-7:

The PGW 105 may send a Create Session Response to the SGW 115 as per normal procedures.

Message 8-8:

The SGW 115 may send a Create Session Response to the MME/S4-SGSN as per normal procedures.

Message 8-9:

The PCRF 105 may respond to the MME/S4-SGSN session request. This message may happen at any time after message 6. The PCRF 105 may subscribe to event notifications from the MME/S4-SGSN at this point. A few non-limiting examples of event notifications may be changes to cell-id, 51-connection status or any other information that is available in the MME/S4-SGSN for this user. The PCRF 105 may also at this point in time provide the MME/S4-SGSN with personalized parameters. A few non-limiting examples of such parameters may be a value for user inactivity timeout or any other parameter that could be used by the MME/S4-SGSN for this UE and connection.

Message 8-10:

The attach procedure may continue after message 16 in TS 23.401 v9.8.0 (2011-03). Any personalized parameters provided to the MME/S4-SGSN from the PCRF may be applied and used internally in the MME/S4-SGSN and in successive procedures of relevance.

Figure 9:
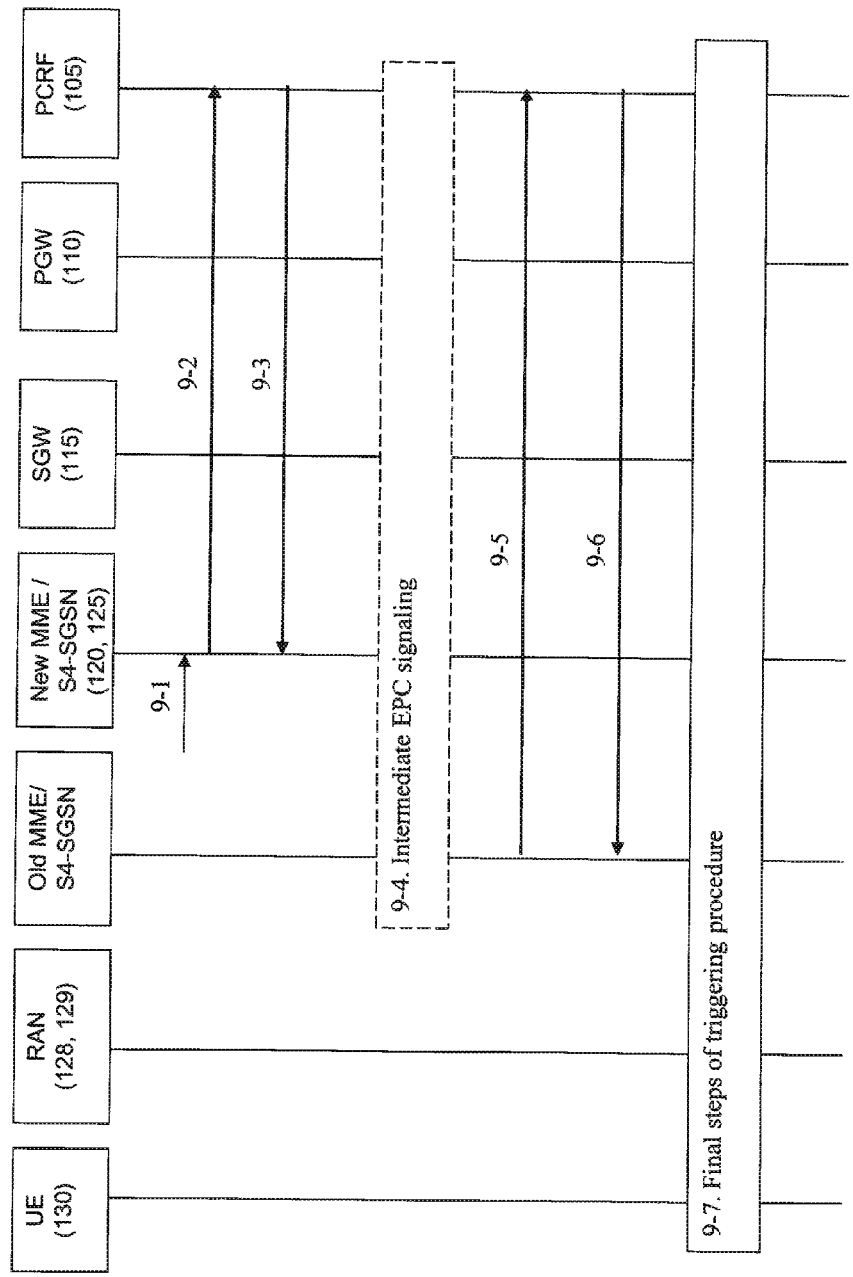
FIG. 9 is a message sequence diagram which utilizes a MME/S4-SGSN-PCRF interface 610, according to some example embodiments.

FIG. 9 illustrates an example of a MME/S4-SGSN-PCRF interface 610 establishment during a MME/S4-SGSN relocation procedure, according to some of the example embodiments. The different messages of FIG. 9 will be explained below according to the corresponding heading.

Message 9 1:

The new MME node 120 or the new S4-SGSN node 125 as may be the case may receive an indication during a TAU/RAU or handover that triggers the MME/S4-SGSN to establish a session towards the PCRF 105. In case of a Tracking Area Update (TAU) or Routing Area Update (RAU) this indication may be provided from the old MME/S4-SGSN in the Context Response. In case of a handover the indication may be a provided from the old MME/S4-SGSN in the Forward Relocation Request. In case no indication was received from the old MME/S4-SGSN/S4-SGS then this might mean that the old MME/S4-SGSN did not support the feature. In this case the new MME node 120 or new S4-SGSN 125 as may be the case may anyway decide to try to establish a new session towards the PCRF 105.

Message 9 2:

The new MME/S4-SGSN may initiate the new interface 610 towards the PCRF 105 and includes at least the UE Identity and PDN Identifier. The UE's identity and PDN Identifier requested are used to identify the subscriber and in PCRF selection to locate the PCRF function with the corresponding IP CAN session established by the PDN GW. The new MME/S4-SGSN may provide additional parameters such as MME/S4-SGSN capabilities and restriction, RAN capabilities and restriction, UE capabilities and restrictions or any other information that is available in the new MME/S4-SGSN that is relevant for this user and connection.

Message 9-3:

The PCRF 105 may respond to the MME/S4-SGSN session request. The PCRF 105 may subscribe to event notifications from the new MME/S4-SGSN at this point. A few non-limiting examples of such event notifications may be based on changes to cell-id, S1-connection status or any other information that is available in the MME/S4-SGSN for this user. The PCRF may also at this point in time provide the MME/S4-SGSN with personalized parameters. A few non-limiting examples of such parameters may be a value for user inactivity timeout or any other parameter that could be used by the new MME/S4-SGSN for this UE and connection.

Message 9 4:

Any suitable intermediate EPC signalling may take place. In case the old MME/S4-SGSN indicated to the new MME/S4-SGSN to establish a session towards the PCRF 105 then the new MME/S4-SGSN may include an indication back to the old MME/S4-SGSN in the Context Acknowledge (in case of TAU/RAU) or in the Forward Relocation Response (in case of handover) that it supports the interface towards PCRF 105.

Message 9 5:

The old MME/S4-SGSN may send a final request/termination request towards the PCRF 105. In case the new MME/S4-SGSN did not indicate in the Context Acknowledge or Forward Relocation Response that is supported by the interface towards the PCRF 105 then the old MME/S4-SGSN may indicate this to the PCRF 105 in this final request/termination request.

Message 9 6:

The PCRF 105 may acknowledge the termination request and by that terminate the session towards the old MME/S4-SGSN. In case the new MME/S4-SGSN did not support the interface to the PCRF 105 the PCRF 105 may take further actions e.g. subscribe to cell-id changes visa legacy mechanisms (i.e. from the PGW 110).

Message 9 7:

Any suitable final steps may be taken to finalise the relocation procedure illustrated in FIG. 9.

Figure 10:
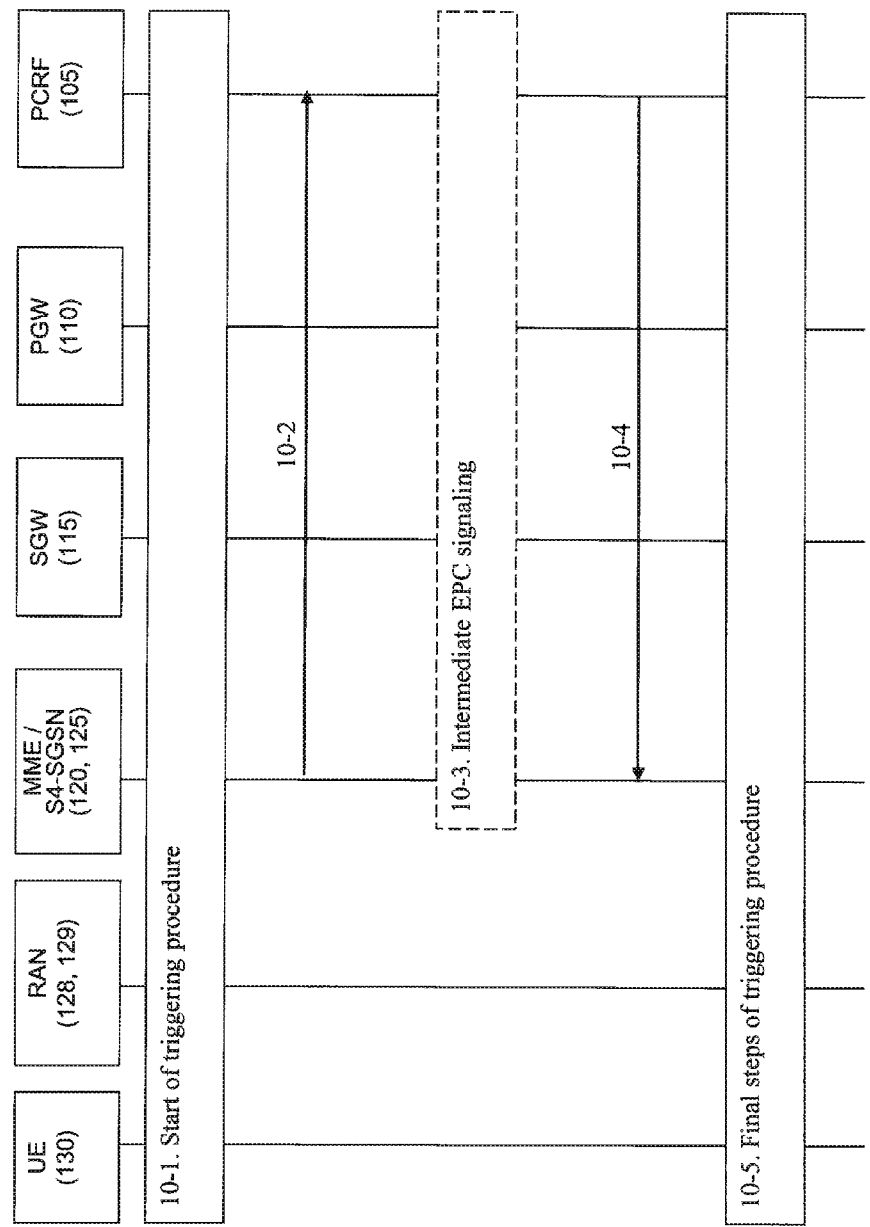
FIG. 10 is a message sequence diagram which utilizes a MME/S4-SGSN-PCRF interface 610, according to some example embodiments.

FIG. 10 illustrates an example of MME/S4-SGSN reporting, according to some of the example embodiments. The different messages of FIG. 10 will be explained below according to the corresponding heading.

Message 10 1:

An event occurs at the MME node 120 or the S4-SGSN node 125 that matches an event that the PCRF has subscribed to. A few non-limiting examples of such events may be cell-id change, S1-connection status change, change of subscribed QoS, etc. The event may be triggered e.g. by a TAU- or RAU-procedure, by a handover procedure or by an interaction from HSS. Other events are possible.

Message 10 2:

The MME/S4-SGSN may initiate an intermediate request towards the PCRF 105 and the request may comprise the updated information.

Message 10 3:

Any suitable known intermediate signalling in the EPC may take place depending on the triggering procedure.

Message 10 4:

The PCRF 105 may acknowledge the MME/S4-SGSN request and may at this point make changes to subscriptions of notifications and provide new or additional personalized parameters, e.g. including said subscriptions (changed or not), to be used by the MME/S4-SGSN for this UE and connection.

Message 10 5:

Any suitable final steps may be taken to finalise the triggering procedure illustrated in FIG. 10 (if applicable). Any personalized parameters or actions provided to the MME/S4-SGSN from the PCRF 105 may be applied and used internally in the MME/S4-SGSN and/or in any successive procedures of relevance.

Figure 11:
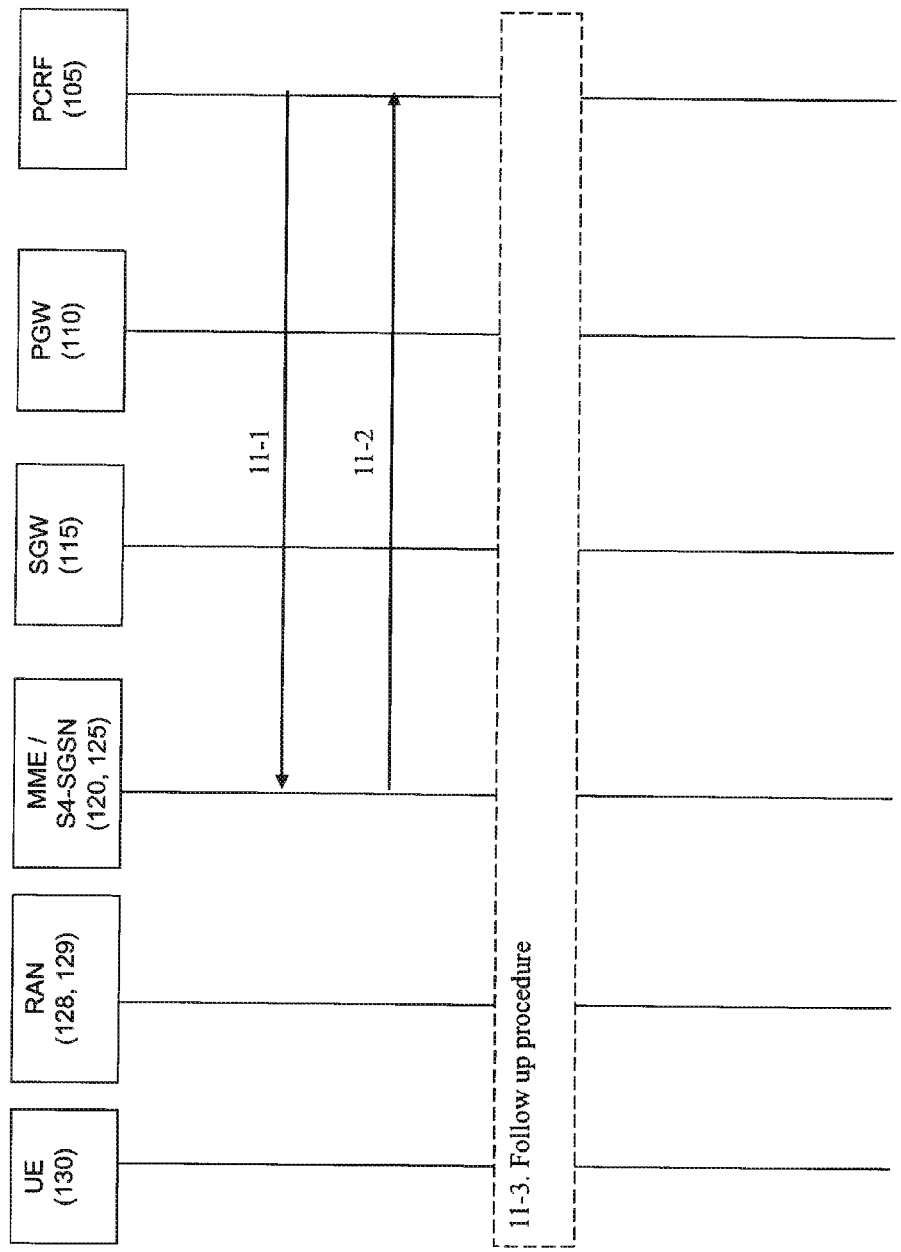
FIG. 11 is a message sequence diagram which utilizes a MME/S4-SGSN-PCRF interface 610, according to some example embodiments.

FIG. 11 illustrates an example of PCRF provisioning according to some of the example embodiments. The different messages of FIG. 11 will be explained below according to the corresponding heading.

Message 11 1:

Either a PCRF internal event may occur, or an event caused by incoming signalling from an external interface (e.g. Rx, Sd, Ud, Sp, Sy) may occur that implies that a new policy decision is needed for the MME node 120 or the S4-SGSN node 125 as may be the case. The PCRF 105 may send a request via the interface 610 to the MME/S4-SGSN that may comprise changes to subscriptions of notifications and/or new or updated personalized parameters or actions.

Message 11 2:

The MME/S4-SGSN may acknowledge the request and may provide information requested by the PCRF 105 via the interface 610.

Message 11 3:

As a result of new or changed personalized parameters or actions provided from the PCRF 105, the MME/S4-SGSN may initiate follow up procedures towards the access network and/or the EPC.

Figure 12:
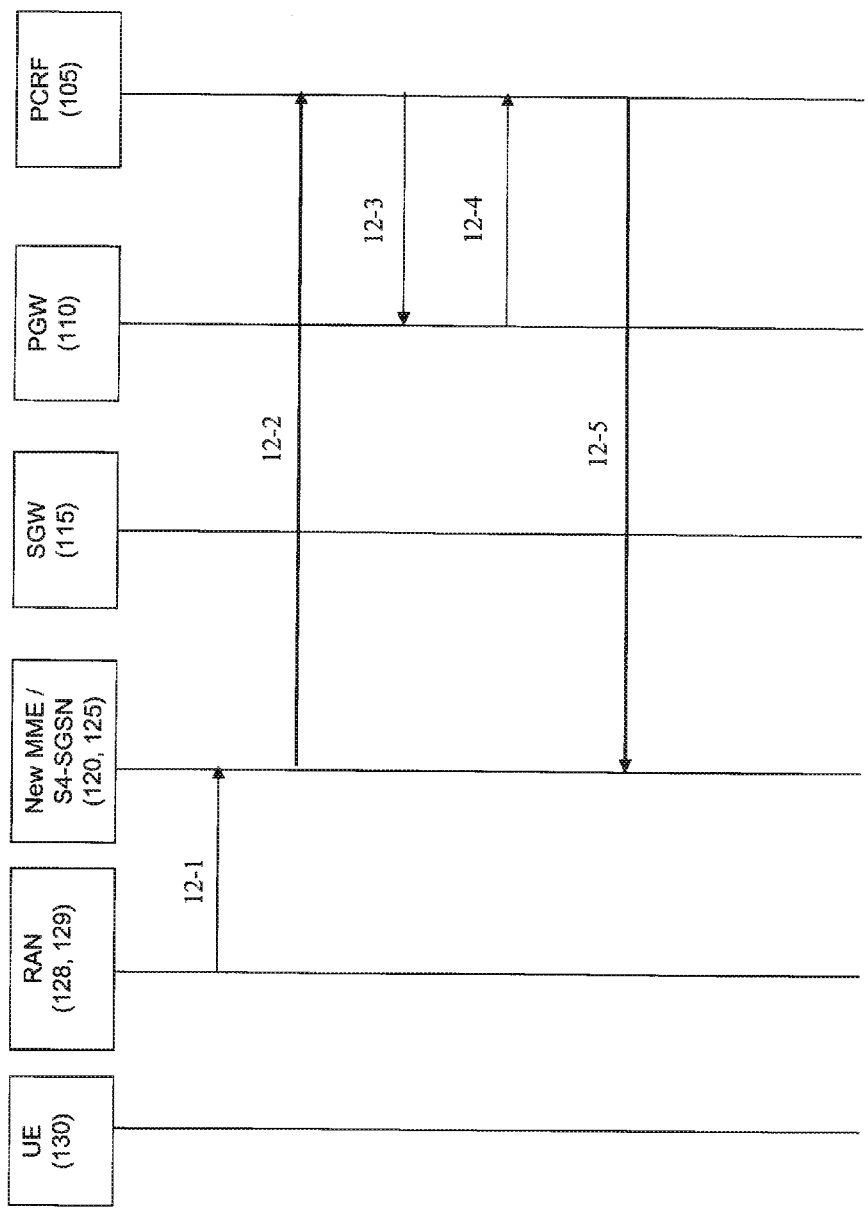
FIG. 12 is a message sequence diagram which utilizes a MME/S4-SGSN-PCRF interface 610, according to some example embodiments.

FIG. 12 illustrates an example use case of location based charging, according to some of the example embodiments. Specifically, the example provided is based on how cell-identification can be performed with the example embodiments presented herein without closing Charging Data Records (CDRs) in the PGW 110 at change of a cell-id. This is a performance problem today as in case cell-id changes are reported from the MME/S4-SGSN to the SGW and PGW then this will cause a closing Charging Data Record (CDR) to be closed each time. Only steps relevant for this example are shown. The different messages of FIG. 12 will be explained below according to the corresponding heading.

Message 12-1:

A change location notification may be sent from the RAN to the MME node 120 or S4-SGSN node 125 as may be the case. It is assumed that the PCRF 105 has previously subscribed to changes in this information over the interface 610 between the MME/S4-SGSN and the PCRF 105.

Message 12 2:

The MME/S4-SGSN may provide the updated location information (cell-id) to the PCRF 105 via the new interface 610. Note that the information is not provided to the SGW and PGW via Change Notification or Modify Bearer Request as is required today in TS 23.401 and TS 23.060.

Message 12 3:

The PCRF 105 may provide and update policy decisions to the PGW 110 comprising updated PCC-rules and/or new Charging-Rule-Base-Name(s). The updated rules and rule-bases may be associated with different Rating Groups/Charging-Keys but the same services may still be authorized. This is preferably done in any suitable known manner, e.g. as described in current 3GPP specifications.

Message 12 4:

The PGW 110 may acknowledge the PCRF notification. The new Rating-Groups/Charging-Keys are applied. From now on reporting in CDRs and over Gy will be done for the updated Rating-Groups/Charging keys. The CDR is not closed as no trigger for CDR closure has been received by the PGW (i.e. it is not aware of cell-change). This is preferably done in any suitable known manner, e.g. as described in current 3GPP specifications.

Message 12 5:

The PCRF 105 may acknowledge the MME/S4-SGSN request.

The example provided by FIG. 12 is based on a configuration of different Rating-Groups/Charging-Keys for different areas e.g. "home-cell" and "non-home-cell". As the PGW 110 is not updated about the location change, there is no closing of the CDRs for this reason. As a result the load from frequently closing of CDRs due to cell-id changes can be eliminated. From a PGW and a SGW point of view this change is fully backwards compliant and requires no additional functionality as compared with existing standards.

It should also be appreciated that the example embodiments may be utilized in sending UE Resource Requests via the MME/S4-SGSN-PCRF interface 610. Thus, a user equipment initiated resource request may be sent to an MME/S4-SGSN node. The MME/S4-SGSN node may then in turn forward the request to the PCRF via the MME/S4-SGSN-PCRF interface 610. The PCRF may thereafter forward the request to the PGW. From the point of view of the PGW, the request will be perceived as being a network initiated request. Thus, utilizing the MME/S4-SGSN-PCRF interface 610, the PGW no longer needs to utilize a mixed mode of operation (i.e., the ability to handle both UE and NW initiated requests for resources).

The attention is now directed to FIGS. 13 16 that illustrate other example use cases, as will be described in some detail below with reference to these figures.

As is well known, in existing standards for E-UTRA access the MME may provide the eNodeB with a Subscriber Profile ID (SPID) information element for Radio Access Technology (RAT) and/or Frequency Selection Priority that is used to define camp priorities in Idle mode and to control inter-RAT/inter-frequency handover in Active mode, see 3GPP TS 36.413 for more details. Before proceeding it should be mentioned that for the example use cases now discussed it is preferred that the SPID information element is received and/or stored by the MME 120 or the S4 SGSN as may be the case. In the example use cases it is preferred that the SPID information element is received from the HSS 1313.

Similarly, it is well known that the SPID (also known as RFSP Index in some specifications, jointly denoted SPID in the following) may be provided from the SGSN to the Radio Network Controller (RNC), for UTRAN access (see 3GPP TS 25.413), and to the Base Station Controller (BSC) for GERAN access (see 3GPP TS 48.018).

This SPID is mapped by the eNB to locally defined configuration in order to apply specific Radio Resource Management (RRM) strategies (e.g. to define RRC_IDLE mode priorities and control inter-RAT/inter frequency handover in RRC_CONNECTED mode). This is the same or similar for GERAN/UTRAN access.

What this means in principle is that the SPID may be used by the Radio Access Network (RAN) in question:
(a) to derive UE/MS specific cell reselection priorities to control idle mode camping.
(b) to decide on redirecting active mode UEs/MSs to different frequency layers or a different Radio Access Technology (RAT).

The MME/SGSN receives the subscribed SPID from the Home Subscriber Server (HSS) (e.g. during the Attach procedure). For example, for non-roaming subscribers (e.g. UEs/MSs or similar) the MME/SGSN chooses the SPID in use according to one of the following procedures, depending on operator's configuration:
(a) the SPID in use is identical to the subscribed SPID, or
(b) the MME/SGSN chooses the SPID in use based on the subscribed SPID, the locally configured operator's policies and the UE/MS related context information available at the MME, e.g. the UE/MS voice capabilities and settings received as part of the UE/MS Network Capability.

Now, the policy profiles in the MME/SGSN are statically configured and are therefore a relatively blunt tool for differentiation. This may be sufficient for the introduction of new radio access technologies where the policy is to use the new (less busy) technology where possible. However when both the new technology and the previous technologies are equally busy then used capacity is not a sufficient base for differentiation, instead the capabilities of the network technologies will become the overriding reason for where to camp a user (e.g. a UE/MS or similar). For example (non exclusive) the policy profiles in the MME/SGSN can not take into account:
(a) dynamic subscriber policies (promotions, usage caps, spending limits).
(b) terminal type, which e.g. may be a smartphone, a LTE modem (dongle), or an ordinary dumbphone (i.e. the retronym of a smartphone).
(c) the service that the user is currently accessing, despite that it may be desirable to steer the UE/MS with a preference for a certain access type that is optimal with regards to service delivery, battery consumption, or potentially coverage or similar.
(d) dynamic user behaviour, e.g. such as monthly usage cap spent/not spent, daily spending limits reached/not reached, etc.
(e) subscriber classification based upon other means (e.g. analytics) that may indicate that a subscriber does not perform activities requiring the newer technologies capabilities.

Some or all of the drawbacks associated with the current handling of SPID (and the RFSP Index jointly denoted SPDI above) are eliminated or mitigated by the example use cases described below with reference to FIGS. 13 16. In these example use cases a subscribed SPID is received in the MME node 120 or the S4 SGSN node 125 from the HSS as is well known, but now also forwarded to the PCRF 105 via the direct interface 610 disclosed herein. In addition it is preferred that the PCRF 105 provides a SPID to be used for a PDN connection to the MME node 120 or the S4 SGSN node as may be the case. The SPID provided from the PCRF 105 may then be communicated by the MME/S4 SGSN towards the RAN, e.g. a eNodeB, or RNC, or BSC (depending on the applicable access the UE/MS is currently camping on. In this way the PCRF 105 may e.g. affect the access selection of the UE/MS for GERAN, UTRAN and E-UTRAN accesses, which may be selected by the MME/S4 SGSN based on the received SPID.

A decision by the PCRF 105 to provide the MME/S4 SGSN with a SPID that is different from the subscribed SPID may be based on any information available in the PCRF 105, e.g. subscriber profile, accumulated usage, spending limits, service(s) in use, terminal type, whether or not the service is a sponsored service etc. Here, the PCRF may or may not take into account the SPID received from the MME/SGSN.

There are no impacts on the existing RAN procedures and there is no impact on the UE.

Figure 13:
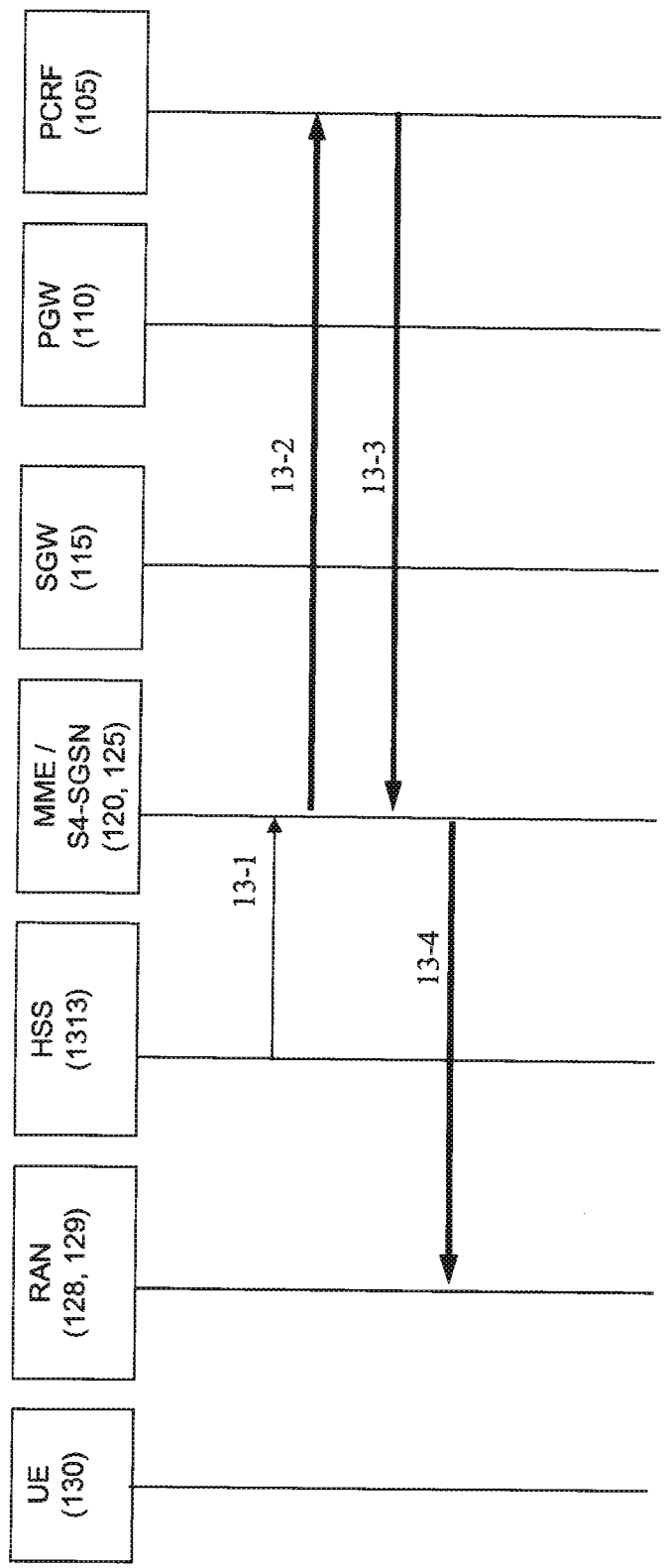
FIG. 13 is a message sequence diagram which utilizes a MME/S4-SGSN-PCRF interface 610, according to some example embodiments.

FIG. 13 illustrates a first example use case for handling the SPID signalling at initiation of a session or similar for the UE 130 or similar. Only steps relevant for this example are shown. The different messages of FIG. 13 will be explained below according to the corresponding heading.

Message 13 1

An initially subscribed SPID is received from the HSS 1313 by the MME node 120 or the S4 SGSN as may be the case. This may be done in any suitable known procedure wherein a message is sent from the HSS 1313 to the MME/S4 SGNS, e.g. a message sent in connection with a procedure initiating a session or similar for the UE 130 or similar, e.g. an attach procedure e.g. as discussed above with reference to FIG. 8, or in connection with a PDN context activation or similar.

Message 13 2

The initially subscribed SPID received from the HSS 1313 is forwarded by the MME/SGSN to the PCRF 105 via the direct interface 610.

Message 13 3

A recommended SPID is provided from the PCRF 105 to the MME/SGSN. The recommended SPID may be the same as the received subscribed SPID, or another SPID obtained by the PCRF based on the subscribed SPID and/or based on any information available in the PCRF 105, e.g. such as subscriber profile, accumulated usage, spending limits, service(s) in use, terminal type, whether or not the service is a sponsored service or similar.

Message 13 4

It is preferred that the MME/S4 SGSN sends the received recommended SPID to the Radio Access Network (RAN). It is preferred that the MME/S4 SGSN sends the recommended SPID to the Radio Access Network (RAN) as per existing known procedures as defined in the 3GPP specifications. However, the MME/S4 SGSN may alternatively send another SPID that is available to the MME/SGSN or obtained by the MME/SGSN. The MME/SGSN may decide to send a certain SPID based on any information available to the MME/S4 SGSN, including the subscribed SPID received from the HSS 1313. For example, the MME/S4 SGSN may disregard the recommended SPID received from the PCRF 105 and send the subscribed SPID. In this way the PCRF 105 may e.g. affect the access selection of the UE/MS for GERAN, UTRAN and E-UTRAN accesses, which may be selected by the MME/S4 SGSN based on the received SPID.

Figure 14:
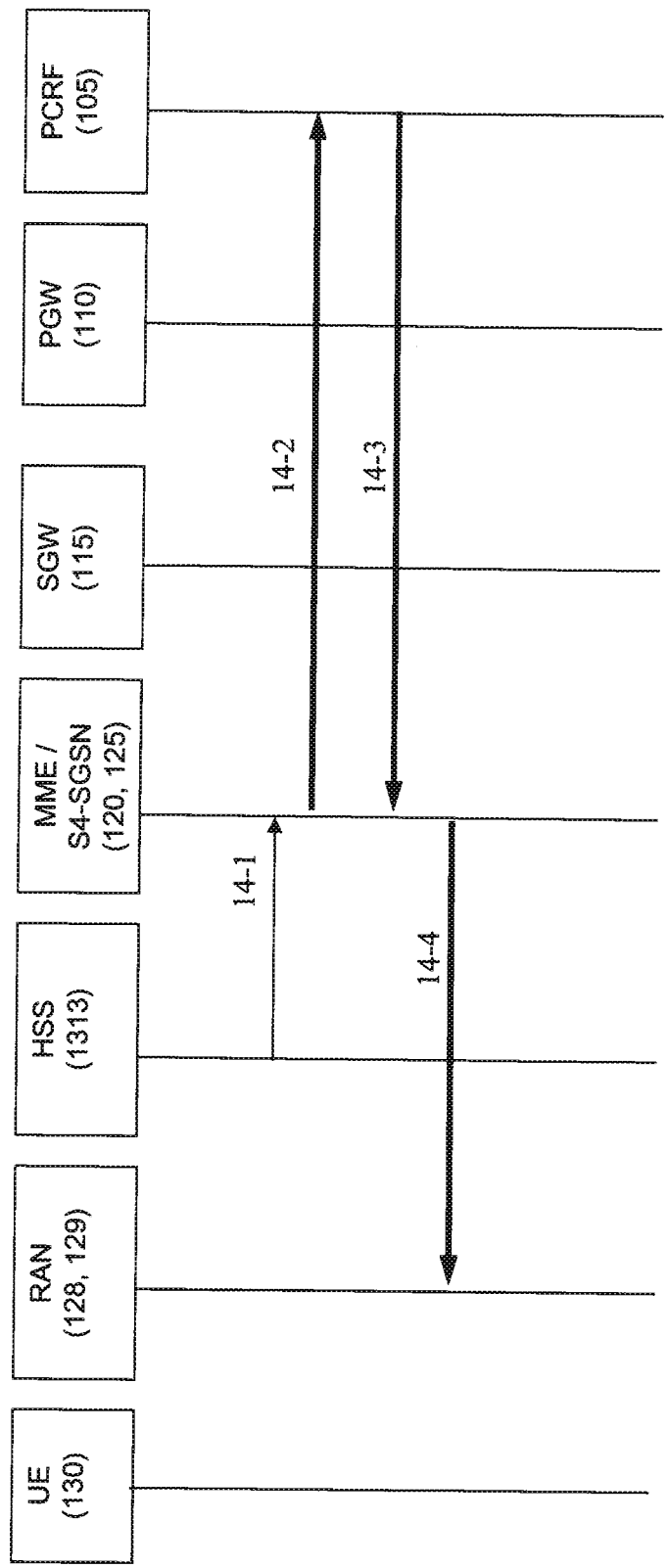
FIG. 14 is a message sequence diagram which utilizes a MME/S4-SGSN-PCRF interface 610, according to some example embodiments.

FIG. 14 illustrates a second example use case for handling SPID signalling, now in connection with a modification and/or update of a session for the UE 130 or similar where the modification is initiated by the HSS 1313, e.g. due to a subscription update. Only steps relevant for this example are shown. The different messages of FIG. 14 will be explained below according to the corresponding heading.

Message 14 1

An updated subscribed SPID is received from the HSS 1313 by the MME node 120 or the S4 SGSN as may be the case. This may be done in any suitable known procedure wherein a message is sent from the HSS 1313 to the MME/S4

SGNS, e.g. a message sent in connection with a procedure modifying and/or updating a session or similar for the UE 130 or similar.

Message 14 2

The updated subscribed SPID received from the HSS 1313 is forwarded by the MME/SGSN to the PCRF 105 via the direct interface 610.

Message 14 3

A recommended SPID is provided from the PCRF 105 to the MME/SGSN. The recommended SPID may be the same as the received subscribed SPID, or another SPID obtained by the PCRF based on the subscribed SPID and/or based on any information available in the PCRF 105, e.g. such as subscriber profile, accumulated usage, spending limits, service(s) in use, terminal type, whether or not the service is a sponsored service or similar.

Message 14 4

It is preferred that the MME/S4 SGSN sends the received recommended SPID to the Radio Access Network (RAN). It is preferred that the MME/S4 SGSN sends the recommended SPID to the Radio Access Network (RAN) as per existing known procedures as defined in the 3GPP specifications. However, the MME/S4 SGSN may alternatively send another SPID that is available to the MME/SGSN or obtained by the MME/SGSN. The MME/SGSN may decide to send a certain SPID based on any information available to the MME/S4 SGSN, including the subscribed SPID received from the HSS 1313. For example, the MME/S4 SGSN may disregard the recommended SPID received from the PCRF 105 and send the subscribed SPID. In this way the PCRF 105 may e.g. affect the access selection of the UE/MS for GERAN, UTRAN and E-UTRAN accesses, which may be selected by the MME/S4 SGSN based on the received SPID.

Figure 15:
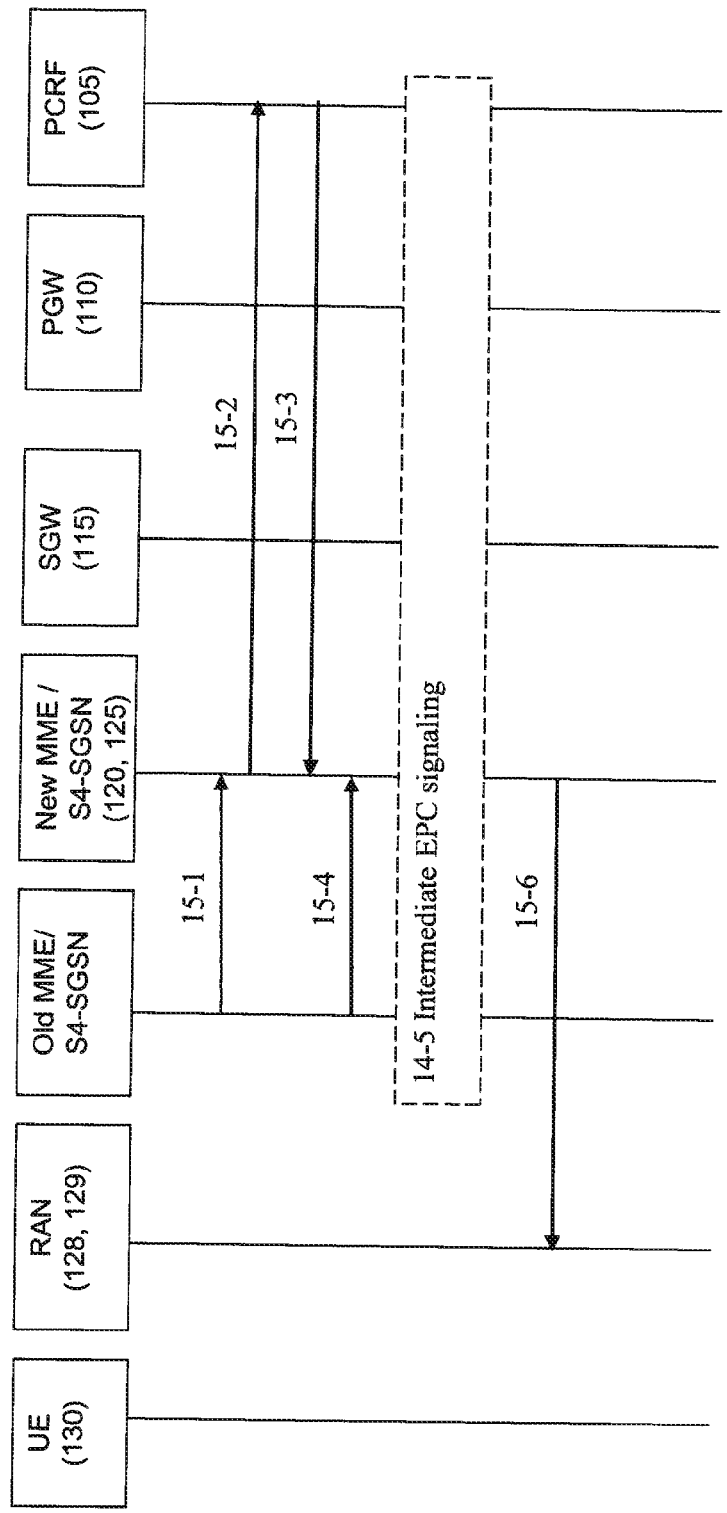
FIG. 15 is a message sequence diagram which utilizes a MME/S4-SGSN-PCRF interface 610, according to some example embodiments.

FIG. 15 illustrates a third example use case for handling SPID signalling, now in connection with a relocation procedure or similar for the UE 130 or similar. The different messages of FIG. 15 will be explained below according to the corresponding heading.

Message 15 1

The new MME node 120 or the new S4-SGSN node 125 as may be the case may receive an indication during a TAU/RAU or handover that triggers the new MME/S4-SGSN to establish a session towards the PCRF 105. This message may be the same or similar as message 9-1 described above with reference to FIG. 9.

Message 15 2:

The new MME/S4-SGSN initiates the new interface 610 towards the PCRF 105 and may include at least the UE Identity and PDN Identifier. The new MME/S4-SGSN may provide additional parameters in this message, e.g. a SPID known to the MME/S4 SGSN at this stage. This message may be the same or similar as message 9-2 described above with reference to FIG. 9.

Message 15 3:

The PCRF 105 may respond to the MME/S4-SGSN session request. The PCRF 105 may provide an updated SPID recommendation in the response to the MME/SGSN. This message may be the same or similar as message 9-3 described above with reference to FIG. 9.

Message 15 4:

Subscribed SPID and SPID in use are forwarded from the old MME/S4 SGSN to the new SGSN/MME, preferably as part of UE context data as per existing known procedures defined by the 3GPP specifications. If a new SPID recommendation was provided to the new MME/SGSN from the PCRF 105 in message 14 3, then the new MME/SGSN may re-evaluate the SPID to be used by the RAN 128, 129

Message 15-5:

Any suitable intermediate EPC signalling may take place. This message may be the same or similar as message 9-4 described above with reference to FIG. 9.

Message 15-6

It is preferred that the new MME/S4 SGSN sends a SPID to the RAN 128, 129 as per existing known procedures as defined in the 3GPP specifications. For example, if a new SPID recommendation was provided to the new MME/SGSN from the PCRF 105 in message 14 3 then the new MME/SGSN send this SPID or a re-evaluate SPID to be used by the RAN 128, 129. Alternatively, the new MME/S4 SGSN may send another SPID that is available to the MME/SGSN or obtained by the new MME/SGSN. The MME/SGSN may decide to send a certain SPID based on any information available to the MME/S4 SGSN, including the subscribed SPID received from the HSS 1313. In this way the PCRF 105 may e.g. affect the access selection of the UE/MS for GERAN, UTRAN and E-UTRAN accesses, which may be selected by the MME/S4 SGSN based on the received SPID. This message may be the same or similar as message 14-4 described above with reference to FIG. 14.

Further messages may be the same or similar as messages 9-5, 9-6 and 9-7 described above with reference to FIG. 9.

Figure 16:
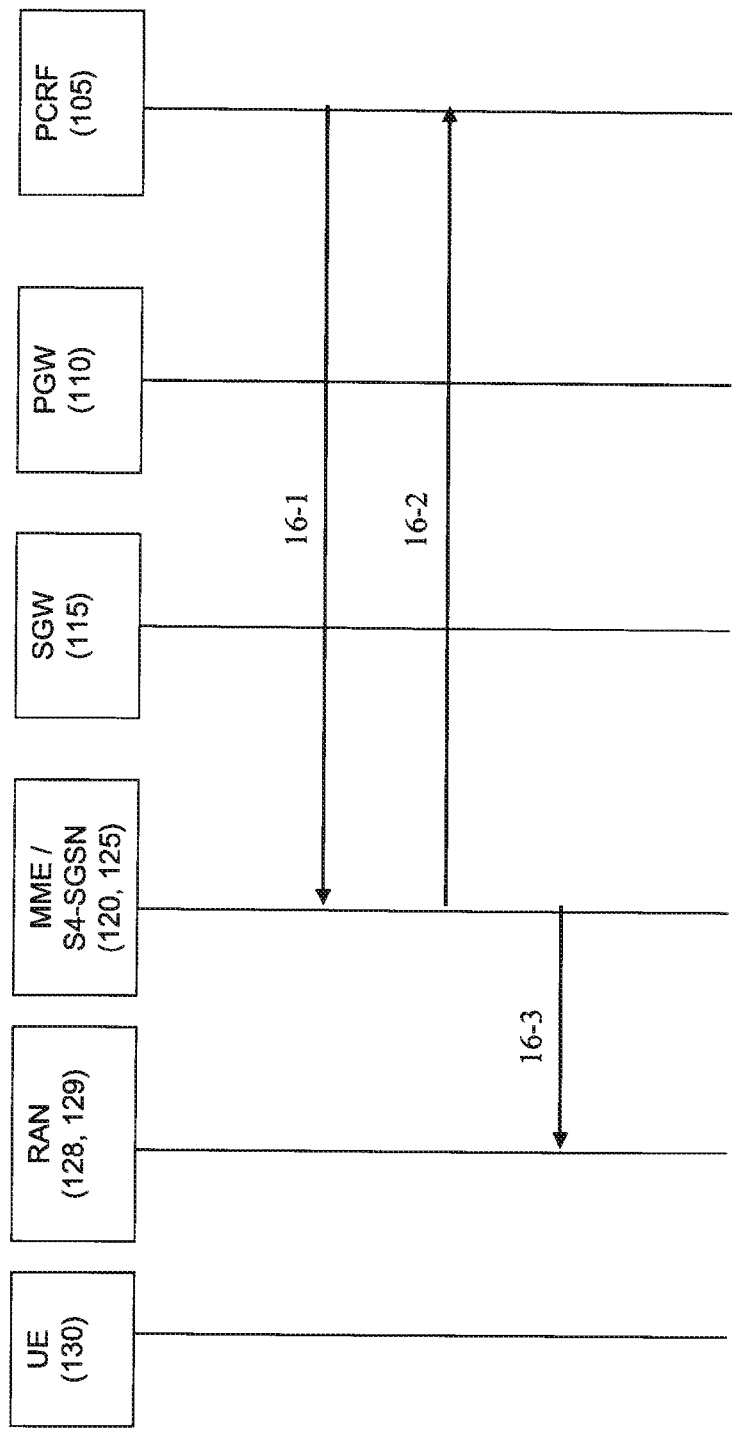
FIG. 16 is a message sequence diagram which utilizes a MME/S4-SGSN-PCRF interface 610, according to some example embodiments.

FIG. 16 illustrates a fourth example use case for handling SPID signalling, now in connection with a relocation procedure or similar for the UE 130 or similar. The different messages of FIG. 16 will be explained below according to the corresponding heading.

Message 16 1:

The PCRF 105 takes a decision to update the SPID recommendation to the MME node 120 or the S4 SGSN for a certain UE 130 or similar. The decision may e.g. be based on any suitable information available and/or obtainable to the PCRF 105, e.g. information retrieved over external interfaces (e.g. Gx, Rx, Sp/Ud, Gxx or Sy), or it may e.g. be an internal policy decision e.g. due to a time of day/day of week policy or similar. The PCRF 105 provides an updated SPID recommendation to the MME/SGSN via the direct interface 610.

Message 16 2:

The MME/S4-SGSN acknowledges the update via the direct interface 610.

Message 16 3:

It is preferred that the MME/S4 SGSN sends a SPID to the RAN 128, 129 as per existing known procedures as defined in the 3GPP specifications. For example, the MME/S4 SGSN may send the new SPID recommendation provided from the PCRF 105 in message 16 3, or a re-evaluated SPID or any other SPID that is available to the MME/SGSN or obtained by the MME/SGSN. The MME/SGSN may decide to send a certain SPID based on any information available to the MME/S4 SGSN, including the subscribed SPID received in message 16 1. In this way the PCRF 105 may e.g. affect the access selection of the UE/MS for GERAN, UTRAN and E-UTRAN accesses, which may be selected by the MME/S4 SGSN based on the received SPID.

Some example embodiments described above may be summarised in the following manner:

One embodiment is directed to a method in a MME, node or a S4-SGSN node configured for dynamic PCRF, assisted management of network parameters. The method comprising: sending or receiving network related parameters to or from, respectively, a PCRF node through a direct MME/S4-SGSN-PCRF interface.

The direct interface may e.g. be used to provide input that is specific for the MME node or the S4 SGSN node directly to the PCRF node 105. The MME/S4 SGSN specific input may e.g. be at least one of cell-id change or S1-connection status change or change of subscribed QoS or User Location Information (ULI) or UE Time zone information or Closed Subscriber Group (CSG) information.

The method may further comprise receiving the network related parameters from the PCRF node, wherein the network related parameters are service or user specific parameters. The parameter may e.g. be a Subscriber Profile ID (SPID) information element.

The method of may further comprise sending the network related parameters to the PCRF node, where the network related parameters are at least one of user location specific parameters or S1-connection status or RAN capabilities or QoS parameters or Subscriber Profile ID (SPID) information element received or stored within the MME node or S4-SGSN node.

The method may further comprise sending the network related parameters according to a PCRF subscription based on at least one of a cell identification change, a tracking area update, or any other user mobility related occurrence.

The method may further comprise sending the network related parameters upon receiving a request for information from the PCRF node.

The method may further comprise sending the network related parameters to the PCRF node, wherein the network related parameters are comprised in a user initiated resource request.

The direct MME/S4-SGSN-PCRF interface may be established during an initial attach procedure, or a MME or S4-SGSN relocation procedure, or provided when a new connection towards an external data network is established or modified.

Some other example embodiments described above may be summarised in the following manner:

One embodiment is directed to method in a PCRF node configured for dynamic management of network parameters, the method comprising: sending or receiving network related parameters to or from, respectively, a MME node or aS4-SGSN node through a direct MME/S4-SGSN-PCRF interface.

The method may further comprise sending the network related parameters to said MME node or S4-SGSN node, wherein the network related parameters are service and/or user specific parameters.

The method may further comprise receiving the network related parameters from said MME node or S4-SGSN node, where the network related parameters are at least one of user location specific parameters or S1-connection status or RAN capabilities or QoS parameters or Subscriber Profile ID (SPID) information element received or stored within said MME node or S4-SGSN node.

The method may further comprise receiving the network related parameters according to a PCRF subscription based on at least one of a cell identification change, a tracking area update, or any other user mobility related occurrence.

The method may further comprise receiving the network related parameters upon sending a request for information to said MME node or S4-SGSN node.

The method may further comprise receiving the network related parameters from said MME node or S4-SGSN node, wherein the network related parameters are comprised in a user initiated resource request.

The direct MME/S4-SGSN-PCRF interface may be established during an initial attach procedure, or a MME or S4-SGSN relocation procedure, or provided when a new user connection towards an external data network is established or modified.

Some other example embodiments described above may be summarised in the following manner:

One embodiment is directed to a MME node or a S4-SGSN node configured for dynamic PCRF assisted management of network parameters, the method comprising: a transceiver port configured to send or receive network related parameters to or from, respectively, a PCRF node through a direct MME/S4-SGSN-PCRF interface.

The transceiver port may be further configured to receive the network related parameters from the PCRF node, wherein the network related parameters are service or user specific parameters.

The transceiver port may be further configured to send the network related parameters to the PCRF node, where the network related parameters are at least one of user location specific parameters or S1-connection status or RAN capabilities or QoS parameters or Subscriber Profile ID, SPID, information element received or stored within said MME node or S4-SGSN node.

The transceiver port may be further configured to send the network related parameters according to a PCRF subscription based on at least one of a cell identification change, a tracking area update, or any other user mobility related occurrence.

The transceiver port may be further configured to send the network related parameters upon receiving a request for information from the PCRF node.

The transceiver port may be further configured to send the network related parameters to the PCRF node, wherein the network related parameters are comprised in a user initiated resource request.

The direct MME/S4-SGSN-PCRF interface may be established during an initial attach procedure or a MME or S4-SGSN relocation procedure, or provided when a new connection towards an external data network is established or modified.

Some other example embodiments described above may be summarised in the following manner:

One embodiment is directed to a PCRF node configured for dynamic management of network parameters, comprising: a transceiver port configured to send or receive network related parameters to or from, respectively, a MME node or a S4-SGSN node through a direct MME/S4-SGSN-PCRF interface.

The transceiver port may be further configured to send the network related parameters to said MME node or S4-SGSN node, wherein the network related parameters are at least one of service or user specific parameters.

The direct interface may be used to provide control plane policy decisions to the MME node or the S4-SGSN node from the PCRF node based on application needs such as, for example at least one of user inactivity timeout to be further provided to a radio access network, or application based paging schemes, or best suited Radio Access Technology (RAT) per application, or 3GDT qualification usage controlled by application in use creating a dynamical 3GDT usage, or Closed Subscriber Group (CSG), or Home zone data limitations, or time based charging control schemes.

The transceiver port may be further configured to receive the network related parameters from said MME node or S4-SGSN node, where the network related parameters are at least one of user location specific parameters or S1-connection status or RAN capabilities or QoS parameters or Subscriber Profile ID, SPID, information element received or stored within said MME node or S4-SGSN node.

The transceiver port may be further configured to receive the network related parameters according to a PCRF subscription based on at least one of a cell identification change, a tracking area update, or any other user mobility related occurrence.

The PCRF node may subscribe to event notifications from the MME node or the S4 SGSN node as may be the case. The PCRF node may send a request to the MME node or the S4-SGSN node, which request may comprise changes to subscriptions of notifications and/or new or updated personalized parameters or actions.

The transceiver port may be further configured to receive the network related parameters upon receiving a request for information from the PCRF node.

The transceiver port may be further configured to receive the network related parameters from said MME node or S4-SGSN node, wherein the network related parameters are comprised in a user initiated resource request.

The direct MME/S4-SGSN-PCRF interface may be established during an initial attach procedure or a MME or S4-SGSN relocation procedure, or provided when a new user connection towards an external data network is established or modified.

The example embodiments discussed above have been presented for purposes of illustration and description. Thus, the foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station). The example embodiments are not limited to LTE, but may apply with any RAN, single- or multi-RAT. Some other RAT examples are LTE-Advanced, UMTS, HSPA, GSM, cdma2000, HRPD, WiMAX, and WiFi.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a Mobility Management Entity (MME) node or a S4-SGSN node for dynamic Policy and Charging Rules Function (PCRF) assisted management of network parameters, the method comprising:
communicating with a PCRF node through a direct MME/S4-SGSN-PCRF interface, wherein the step of communicating with the PCRF node through the direct MME/S4-SGSN-PCRF interface comprises:
sending network related parameters to the PCRF node through the direct MME/S4-SGSN-PCRF interface; and
the step of sending the network related parameters comprises sending the network related parameters according to a PCRF subscription based on at least one of a cell identification change or a tracking area update, wherein
the step of sending the network related parameters comprises sending the network related parameters in response to receiving a request for information from the PCRF node and the sent network related parameters are comprised in a user initiated resource request.

2. The method of claim 1, wherein
the step of communicating with the PCRF node through the direct MME/S4-SGSN-PCRF interface comprises receiving network related parameters from the PCRF node through the direct MME/S4-SGSN-PCRF interface, and
the received network related parameters are at least one of service or user specific parameters.

3. The method of claim 1, wherein
the sent network related parameters include at least one of: user location specific parameters; S1-connection status parameters, RAN capabilities parameters, QoS parameters, and Subscriber Profile ID (SPID) information element received or stored within said MME node or S4-SGSN node.

4. The method of claim 1, wherein the direct MME/S4-SGSN-PCRF interface is established during an initial attach procedure, or a MME or S4-SGSN relocation procedure, or provided when a new connection towards an external data network is established or modified.

5. A method in a Policy and Charging Rules Function (PCRF) node configured for dynamic management of network parameters, the method comprising:

communicating with a network node through a direct MME/S4-SGSN-PCRF interface, wherein the network node is one of a Mobility Management Entity (MME) node and a S4-SGSN node, and the step of communicating with the network node through said direct interface comprises:

receiving network related parameters from the network node through said direct interface; and the step of communicating with the network node through said direct interface comprises receiving network related parameters from said network node according to a PCRF subscription based on at least one of a cell identification change or a tracking area update, wherein network related parameters are received from the network node in response to sending a request for information to said network node and the network related parameters are comprised in a user initiated resource request.

6. The method of claim 5, wherein the step of communicating with the network node through said direct interface comprises transmitting network related parameters to said network node, and the transmitted network related parameters include at least one of: service parameters and user specific parameters.

7. The method of claim 5, wherein the received network related parameters include at least one of: user location specific parameters, S1-connection status parameters, RAN capabilities parameters, QoS parameters, and Subscriber Profile ID (SPID) information element received or stored within said network node.

8. The method of claim 5, wherein the direct MME/S4-SGSN-PCRF interface is established during an initial attach procedure, or a MME or S4-SGSN relocation procedure, or provided when a new user connection towards an external data network is established or modified.

9. A Mobility Management Entity (MME) node or a S4-SGSN node configured for dynamic Policy and Charging Rules Function (PCRF) assisted management of network parameters, comprising:

a transceiver port configured to send network related parameters to a Policy and Charging Rules Function (PCRF) node through a direct MME/S4-SGSN-PCRF interface, wherein the transceiver port is further configured to send the network related parameters according to a PCRF subscription based on at least one of a cell identification change or a tracking area update, and send the network related parameters upon receiving a request for information from the PCRF node, wherein the network related parameters are comprised in a user initiated resource request.

10. The node of claim 9, wherein the transceiver port is further configured to receive network related parameters from the PCRF node, wherein the network related parameters are service or user specific parameters.

11. The node of claim 9, wherein the network related parameters are at least one of user location specific parameters or S1-connection status or RAN capabilities or QoS parameters or Subscriber Profile ID, SPID, information element received or stored within said MME node or S4-SGSN node.

12. The node of claim 9, wherein the direct MME/S4-SGSN-PCRF interface is established during an initial attach procedure or a MME or S4-SGSN relocation procedure, or provided when a new connection towards an external data network is established or modified.

13. A Policy and Charging Rules Function (PCRF) node configured for dynamic management of network parameters, comprising:

a transceiver port configured to receive network related parameters from a Mobility Management Entity (MME) node or a S4-SGSN node through a direct MME/S4-SGSN-PCRF interface, wherein the transceiver port is further configured to receive the network related parameters according to a PCRF subscription based on at least one of a cell identification change, a tracking area update, or any other user mobility related occurrence, and receive the network related parameters in response to sending a request for information to said MME node or a S4-SGSN node, and the network related parameters are comprised in a user initiated resource request.

14. The node of claim 13, wherein the transceiver port is further configured to send network related parameters to said MME node or S4-SGSN node, wherein the network related parameters are at least one of service and/or user specific parameters.

15. The node of claim 13, wherein the network related parameters are at least one of user location specific parameters or S1-connection status or RAN capabilities or QoS parameters or Subscriber Profile ID, SPID, information element received or stored within said MME node or S4-SGSN node.

16. The node of claim 13, wherein the direct MME/S4-SGSN-PCRF interface is established during an initial attach procedure or a MME or S4-SGSN relocation procedure, or provided when a new user connection towards an external data network is established or modified.

* * * * *

UNITED STATES PATENT AND TRADEMARK OFFICE
CERTIFICATE OF CORRECTION

| | | |
|---|---|---|
| PATENT NO. | : 8,737,956 B2 | Page 1 of 1 |
| APPLICATION NO. | : 13/650764 | |
| DATED | : May 27, 2014 | |
| INVENTOR(S) | : Stenfelt et al. | |

It is certified that error appears in the above-identified patent and that said Letters Patent is hereby corrected as shown below:

Title page, item (56), under "OTHER PUBLICATIONS", in Column 2, Line 5, delete "XP03112781." and insert -- XP031132781. --, therefor.

Title page, item (56), under "OTHER PUBLICATIONS", in Column 2, Line 15, delete "XP05029331." and insert -- XP050259331. --, therefor.

Title page, item (56), under "OTHER PUBLICATIONS", in Column 2, Line 16, delete "Seach Repot" and insert -- Search Report --, therefor.

In the Specification

Column 3, Lines 11-12, delete "embodiments. and" and insert -- embodiments. --, therefor.

Column 7, Line 26, delete "PGW 105" and insert -- PGW 110 --, therefor.

Column 7, Line 38, delete "51-connection" and insert -- S1-connection --, therefor.

Column 12, Line 21, delete "SGNS," and insert -- SGSN, --, therefor.

Column 13, Line 1, delete "SGNS," and insert -- SGSN, --, therefor.

Signed and Sealed this
Eleventh Day of November, 2014

Michelle K. Lee
*Deputy Director of the United States Patent and Trademark Office*